United States Patent [19]
Griggs et al.

[11] Patent Number: 5,341,595
[45] Date of Patent: Aug. 30, 1994

[54] ENVIRONMENTAL CHAMBER FOR PLANT GROWTH ANALYSIS

[75] Inventors: Steven H. Griggs, Cleveland; William E. Bartley; Adrian O. Rule, III, both of Chargin Falls, all of Ohio

[73] Assignee: Environmental Growth Chambers, Chagrin Falls, Ohio

[21] Appl. No.: 898,569

[22] Filed: Jun. 15, 1992

[51] Int. Cl.5 .................................... A01G 31/00
[52] U.S. Cl. ............................................. 47/60
[58] Field of Search ............... 47/60 R, 60 W, 60 EC, 47/60 NL, 17 I

[56] References Cited

U.S. PATENT DOCUMENTS

| | | |
|---|---|---|
| 3,492,761 | 2/1970 | Taylor . |
| 4,068,421 | 1/1978 | Marovich . |
| 4,850,134 | 7/1989 | Snekkenes . |
| 4,850,135 | 7/1989 | DeMarco . |
| 4,895,904 | 1/1990 | Allingham . |

FOREIGN PATENT DOCUMENTS

| | | | |
|---|---|---|---|
| 91692 | 9/1961 | Denmark | 47/60 R |
| 2029917 | 2/1987 | Japan | 47/60 EC |
| 546324 | 3/1977 | U.S.S.R. | 47/60 EC |
| 1020036 | 5/1983 | U.S.S.R. | 47/60 EC |
| 1087116 | 4/1984 | U.S.S.R. | 47/60 EC |
| 1492870 | 11/1977 | United Kingdom | 47/60 W |

OTHER PUBLICATIONS

B. Acock, D. A. Charles Edwards & A. R. Hearn Growth Response of a Chrysanthemum Crop. . . Feb. 20, 1976.

B. Acock, Protype Airtight, Daylit, Controlled-Environment Cabinet and the Rational of its Specification (1972).

Primary Examiner—Terry Lee Melius
Assistant Examiner—Joanne C. Downs
Attorney, Agent, or Firm—Oldham, Oldham & Wilson Co.

[57] ABSTRACT

An environmental day-lit chamber for plant growth analysis having therein a growth chamber with a perforated or slotted plant supporting floor for allowing air to be forced vertically through the plant space. The transparent and frameless exterior of the chamber shell allows equalized distribution of sunlight with minimal impedance into the growth chamber. A vertical surface at the rear of the plant growth chamber forms a return air plenum for ducting air through the growth chamber and back to an air conditioning compartment beneath the growth chamber for reconditioning the air. A gasketed door at the front of the chamber shell provides reach-in capacity for entry into the plant growth chamber and expedites the ability to sealing close the growth chamber upon completion of operations therein.

14 Claims, 3 Drawing Sheets

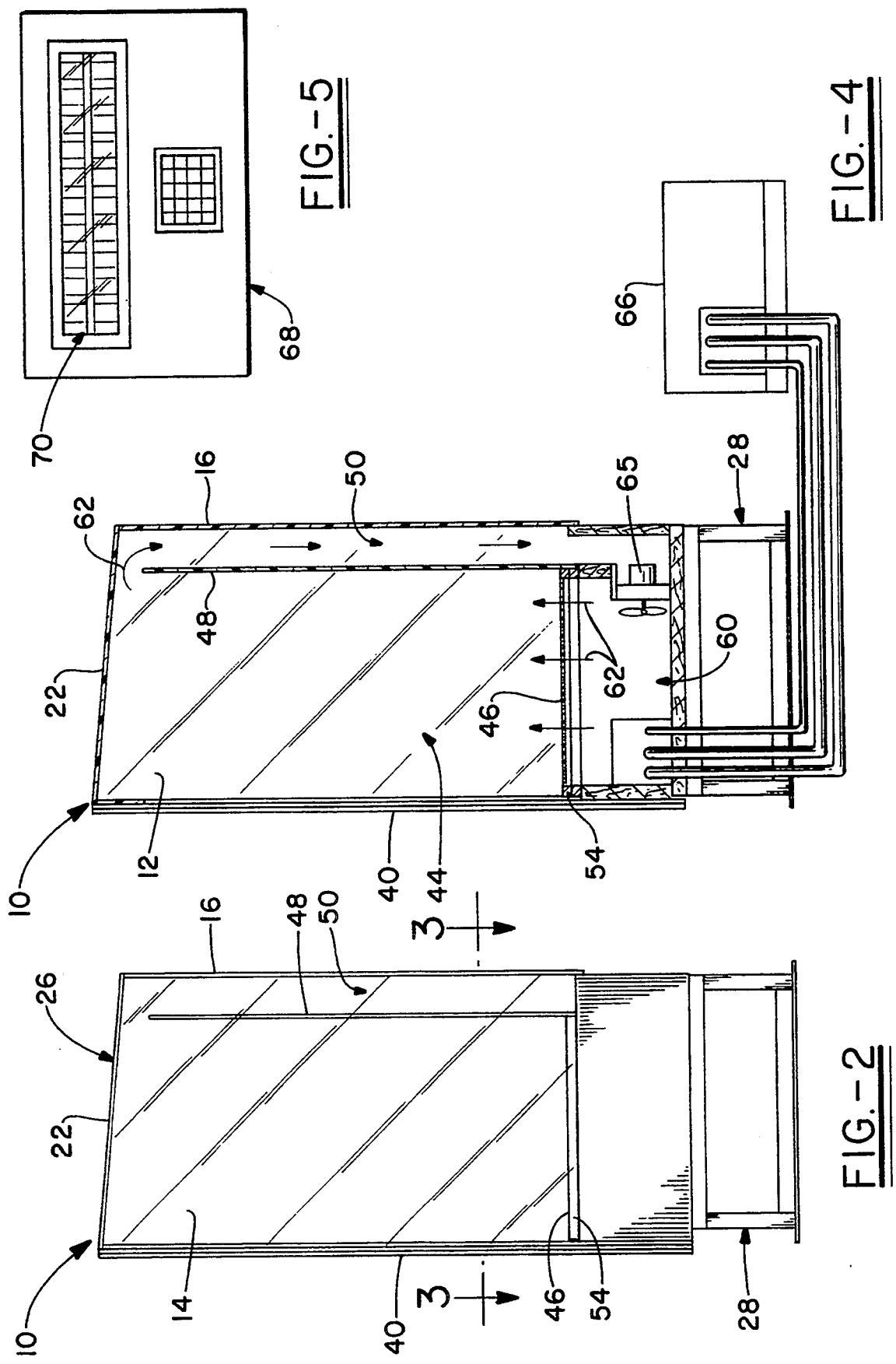

ENVIRONMENTAL CHAMBER FOR PLANT GROWTH ANALYSIS

TECHNICAL FIELD

This invention relates to a growth chamber for conduction of plant experiments under controlled environmental conditions. More particularly, the invention herein pertains to a novel day-lit chamber which substantially eliminates shadows in the plant growth space, can cope with large temperature variations so as to be free-standing and not dependent upon a surrounding greenhouse enclosure, provides air circulating around the plants grown therein, and is adapted for precise measurement of carbon dioxide injection and uptake analysis.

BACKGROUND OF INVENTION

There is found to be a need for apparatus which simulates the outdoor natural environment to some degree, but is adapted for performing carefully controlled experiments relating to plant physiology. Many such experiments are designed and conducted for obtaining data on methods to maximize production of cultivated plants in a given period of time and utilizing a given amount of space. Some cultivated plant experiments are accomplished outdoors in a natural setting with concomitant variations of sunlight, rain, soil and abundant space.

But the natural outdoor setting in which plants are ordinarily cultivated does not provide the requisite milieu to perform carefully controlled experiments. Rainfall, wind and humidity are uncontrollable and unpredictable in the out-of-doors. So experiments to determine optimum levels of plant temperature, humidity, air flow and exposure to light or to determine whether genetic and environmental factors are responsible for certain observed differences among plants must be done in an environmentally controlled chamber.

Most naturally illuminated plant growth chambers in the prior art were designed and built for use inside a greenhouse where the temperature is easily controlled. Other plant growth chambers in the prior art also provided for controlled lighting by inclusion of electric light sources of controlled intensity arranged around the plants in the growth chamber. But it has been found that some plant species grow abnormally under the fluorescent and other types of lamps commonly used in electrically lit chambers.

For example, U.S. Pat. No. 4,850,135, to DeMarco, describes an indoor plant growth apparatus provided with fluorescent lighting because sunlight is unpredictable. In the disclosure of that patent, the lighting is turned on and off with alternating periods of darkness, there are provisions for controlled temperature and air circulation, and vents are provided for escape of air from the apparatus. But this plant irradiation by vertically directed light is potentially disadvantageous, because the light intensity received by the lower leaves of given plant is much less than that received by the upper leaves and the lowermost leaves of the group will have substantially reduced photosynthesis and may die.

The use of daylight should overcome the problem of abnormal plant behavior which presumably results from the spectral composition of the light from fluorescent lamps. The main advantage of day-lit chambers over those which incorporated electric lighting is that they allow plants to be grown in light simulating nature and also of similar quality to that available to commercial greenhouse growers. Another feature of day-lit chambers is that the light photosynthetic photon flux density varies by season, daily and even from minute to minute. This can be disadvantageous when making measurements which integrate changes in plants or environmental factors over periods of time, but has the advantage that plants in the chambers experience the natural daily and seasonal trends.

Furthermore, many environmental growth chambers or cabinets in the prior art were constructed with a wood, aluminum or other metallic frame. The problem confronted here is that such assembly involves significant heat transfer to the frame members, considerable air leakage, and the opaque frame members allow significant variance in the light available within the chamber because of the shadowing thereby created.

Furthermore, some prior art growth chambers with electric lighting have the attendant problem, that the lighting be turned on and off in a regular cycle, in order to provide photostimulation of the plants in the chamber and, also alternate with periods of relative darkness. This necessary on and off cycling of the lighting tends to substantially raise both the initial cost and the cost of operation of the air temperature control means. The wide variations in heat output of the lamps when switched on and off necessitates a higher capacity air conditioning system, so as to provide adequate cooling when the full array of lamps is switched on, and it may also necessitate a higher capacity air heating system to provide adequate heating capacity when the lamp array is switched off in cold weather environments.

SUMMARY OF THE INVENTION

Based on the foregoing, there is found to be a need for a chamber shell for use as a free-standing unit out-of-doors, which incorporates therein a plant growth chamber having environmental controls and utilizes the natural sunlit environment.

It is therefore a principal object of the invention to provide a day-lit plant growth chamber within a chamber shell which is raised from ground level by positioning the chamber shell upon a base, with means to control environment in the growth chamber and means for access into the growth chamber and then sealingly closing the chamber upon concluding operations therein.

Another major objective is to minimize any inequality of temperature and areas of stagnated air in the growth chamber by assuring equalized distribution of air supply to all plants. The objective is met with an air distribution means propelling air vertically into the plant growth chamber and an air return plenum adjacent to the growth chamber for air distribution control.

A further objective is to provide a chamber for conditioning the air at a point external to the growth chamber, so that the air will have the appropriate temperature and carbon dioxide concentration to assure the desired parameters exist before the air is forced vertically into the growth chamber.

A still further objective is to provide a plant growth chamber for experimentation which is positioned within an essentially frameless shell to substantially diminish variations of light entering the growth chamber and optimize natural lighting conditions.

The subject invention achieves these objectives and other by providing a free-standing cabinet for out-of-door use comprising a sealed, transparent, generally rectangular upright box defining a chamber shell. The chamber shell rests upon a base having sufficient height for insulating from ground temperature and defeating wind sheer and the shell incorporates a means for opening and sealingly closing the growth chamber.

The chamber shell is formed of transparent plastic panels to maximize entry of light through the walls which are chemically bonded along their adjacent edges for completely sealing the chamber shell and to ensure a controlled atmosphere within the plant growth chamber, and at the same time, to diminish shadows or other blockage of sunlight. An air return plenum, formed by a vertical wall rising from the floor of the plant growth chamber on the side of the chamber shell opposite the means for opening and sealingly closing, is formed of a transparent plastic panel and is adapted for ease of removal and cleaning. The return air plenum is a single sheet that can be removed.

Problems associated with varying coefficients of thermal expansion in components of the chamber shell are dealt with by utilizing one material, i.e., a transparent plastic material which would preferably be a polymethyl methacrylate. The day-lit chamber would divide naturally into four components; the chamber shell,air conditioning compartment containing equipment for conditioning the air, temperature controller and either a water chiller, or a direct expansion refrigeration system.

The refrigeration system provided is a two phase direct expansion coil, but could be of any suitable type such as a chilled water system, microprocessor/controller is included for temperature and relative humidity control and could also be used for injection of carbon dioxide and monitoring. The air conditioning, temperature and humidity controller could be housed in a separate structure or integrated with the chamber shell, but would preferably be installed in a self contained insulated separate structure having a low profile to avoid shadowing of the growth chamber. Humidity control is mandatorily required, and should include means for maintaining the dew point of the air in the chamber below the temperature of the chamber walls to prevent water condensing on the chamber walls and reflecting light out of the chamber. Any communication with the chamber shell should be by means of insulated tubing and substantial gasketing around the chamber shell apertures to seal all penetrations into the chamber shell.

The interior of the chamber shell comprises the plant growth chamber, having a means for access into the growth chamber. There is an air plenum formed by a vertical, removable wall of transparent plastic which rises from the floor of the plant growth chamber a sufficient distance to allow passage of air over the top thereof in conjunction with a rear wall of the chamber shell, forms the air return plenum for passage of air and complete circulation thereof back to the air conditioning compartment. The compartment for air conditioning may be positioned under the growth chamber to assure uniform distribution of air supply and vertical movement of forced air through a perforated floor of the plant growth chamber.

BRIEF DESCRIPTION OF THE DRAWINGS

Further objects and advantages of the invention will be apparent from the following detailed description of the preferred embodiment invention and from the accompanying drawings, wherein:

FIG. 2 is a side elevational view of the chamber shell depicting the horizontal floor of the growth chamber and vertical wall of the air return plenum in assembled operative form;

FIG. 4 is a side elevational view, in partial section, of the chamber shell depicting air flow vertically directed through the growth chamber and returned thereof through the plenum; and FIG. 5 is a front view of the microprocessor/controller for temperature and relative humidity control, individual carbon dioxide control and monitoring.

DESCRIPTION OF THE PREFERRED EMBODIMENTS

Figure 1A:
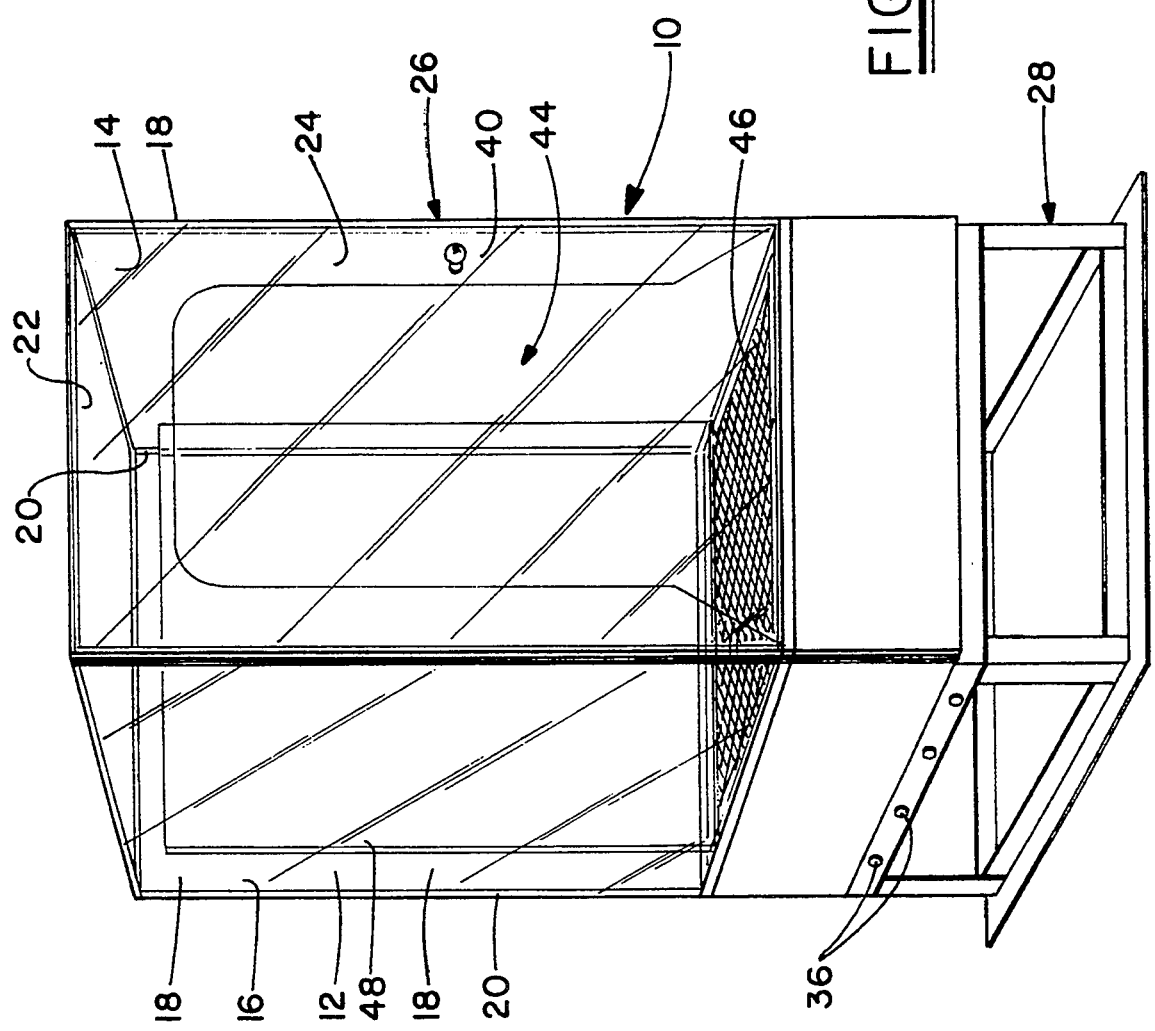
FIG. 1A is a front perspective view of the entire chamber shell.

Referring now to the drawings, FIG. 1A illustrates the generally rectangular growth cabinet 10 of this invention in the preferred embodiment. The two side walls 12, 14 and back 16 of the cabinet 10 are formed of transparent panels 18 which are preferably formed of plastic and chemically bonded along their adjacent edges 20. The roof 22, which is sloped, preferably from front to back of the cabinet to shed rain and condensation, may preferably be a transparent panel of the same plastic material and, also, chemically bonded to the side and back panels. The front panel 24 of the cabinet includes means for opening and sealing closure to allow access to the cabinet's interior. The panels thus connected form a frameless upright box or chamber shell 26 capable of being sealed to provide a substantially airtight interior with greatly diminished air transfer between the cabinet 10 and the outside environment. Since the chamber shell 26 has no means for framing and no ribbing, it intercepts the maximum amount of light. As such, the day-lit cabinet is adapted for plant experimentation with irradiation by sunlight simulating that in nature.

The transparent plastic panels provided for forming the chamber shell 26 are of sufficient thickness to support the shell 26, having requisite rigidity and strength to withstand wind loads and also being relatively immune from ultraviolet degradation or deterioration over a significant time period. The exact plastic to be utilized can be selected from a range including polycarbonates, polyesters and acrylics. An especially preferred plastic would be a polymethyl methacrylate, such as that sold commercially by Monsanto under the tradename PLEXIGLAS. The exact selection of the material and the thickness would be obvious to one of ordinary skill in this art. The plastic selected would also be determined based upon capacity for transmittance of solar energy. The range of thickness for panels of the chamber shell would be from $\frac{3}{8}''$ to $\frac{5}{8}''$ thick.

Since all transparent panels 18 of the chamber shell 26 are composed of the same material, any potential threat to the complete seal due to varying coefficients of thermal expansion, which would increase air transfer, is reduced. This mode of construction is calculated to provide a stand alone growth cabinet for out-of-doors use which is adapted to cope with larger temperature gradients through the walls of the cabinet.

The chamber shell 26 rests upon a support means of sufficient height to provide insulation from ground temperatures. The support means preferably comprise a metal base 28, and the metal base would preferably be constructed of aluminum. As depicted in FIG. 1A, the chamber shell 26 is affixed to the base 28 by a series of bolts 36 through apertures spaced along the lower perimeter of the side panels of the upright cabinet 10 and corresponding apertures in the base, so that as the bolts are tightened down, the cabinet 10 is securely fastened to the base 28. The base 28 is in turn positioned upon and secured to a cement foundation pad to defeat outdoor wind loads. To allow for varying coefficients of thermal expansion between the enclosure material and the aluminum base material the securing bolts are used with rubber washers to allow for expansion and contraction without stressing the enclosure panels.

In order to provide a controlled environment in a growth chamber 44 within the chamber shell 26, all entry points including the apertures in side panels with bolts therethrough described above, are sealed with gasketing material. The preferred type of gasket material 38 is preferably comprised of a closed-cell neoprene foam which is non-reactant with carbon dioxide, since one anticipated use for the cabinet is CO2 injection and uptake analysis.

Figure 1B:
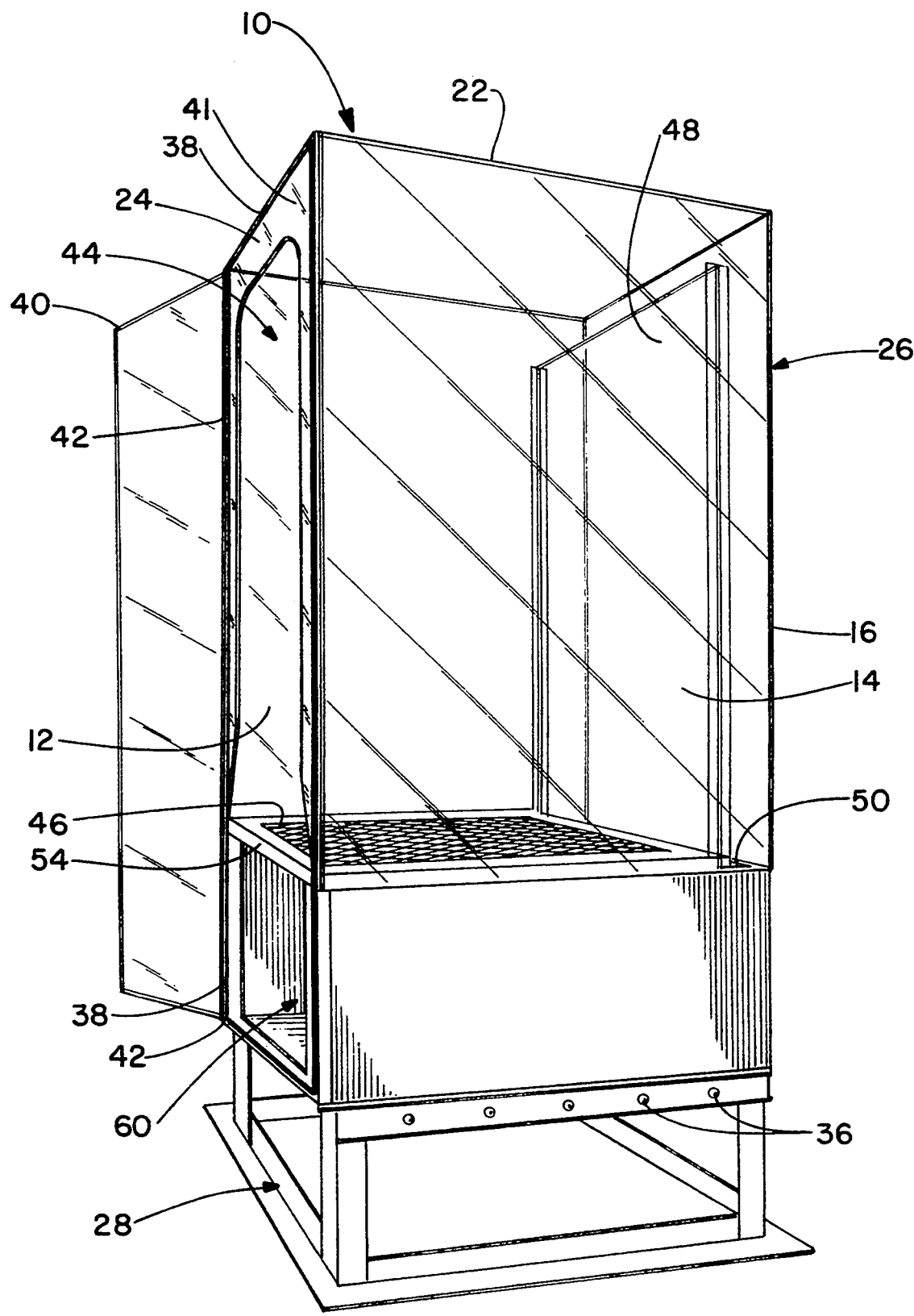
FIG. 1B is a side perspective view of the chamber shell demonstrating gasketed door and reach-in characteristic of the shell.

Referring now to FIG. 1B, this figure indicates the reach-in characteristic of the cabinet by providing means for opening and sealingly closing thereof which may comprise a door 40 formed of a panel at the front of the cabinet. The door 40 may be movably mounted to one of the side panels or roof of the cabinet. In the preferred embodiment, the door 40 is rotatably coupled to one of the side panels by metal hinges 42, preferably aluminum hinges, extending the full length of the plastic side panel to which the door is preferably rotatably coupled to distribute load of the door over full length of the panel and tending to reduce potential for cracking. The metal hinge 42 may be double gasketed, preferably rubber doughnut gaskets 43 separating metal from plastic, to further minimize force concentration at hinge points. However, the metal hinge may not be gasketed. In such a situation there are rubber doughnut gaskets between the metal base frame and the plex cabinet. Structural sway bracing 41, preferably of the same transparent plastic is provided to surround and reinforce the door. Gasket material 38 which may preferably be closed-cell neoprene foam is located around the door opening so that the door 40 may be sealingly closed. Other methods of slidingly or otherwise repositionally mounting the door panel 40 on the chamber shell 26 would be obvious to one of ordinary skill in the art.

The side view of the cabinet in FIG. 2, discloses that the chamber shell 26 comprises three chambers or spaces. A plant growth chamber 44 is adjacent the door 40 at the front of the chamber shell 26 for easy access and reach-in capability. A horizontal surface forms a floor 46 to support plants in the plant growth chamber 44. The floor 46, formed of perforated or slotted material to allow passage of air to be forced vertically through, is upheld by horizontal support members 54 which preferably are free standing and not adhered to the walls.

Figure 3:
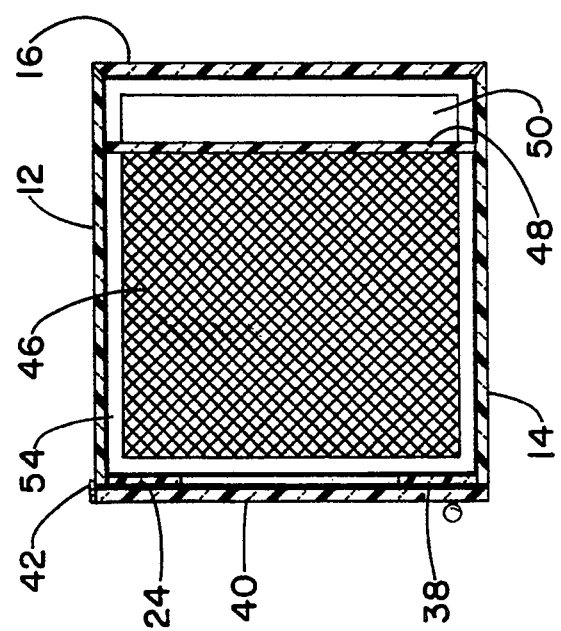
FIG. 3 is a plan view, as may be taken at line 3—3 FIG. 2, of the perforated horizontal surface or floor of the plant growth chamber to allow forced air to pass therethrough.

The plan view of the floor in FIG. 3 with air return plenum duct 50 toward the back of the chamber shell 26, suggests that in the preferred embodiment the floor 46 may be comprised of a metal screen, a perforated metal sheet or a slotted floor.

About 6-8" away from the back wall 16 of the chamber shell 26 a transparent vertical panel comprising a plenum wall 48 rises from the floor 46 to about 6-8" below the roof 22 to form an air plenum duct 50 to return air from the top of the plant growth chamber 44 to a compartment for conditioning the air 60 below the floor 46. The vertical plenum wall 48 is preferably formed of a component part comprised of the same plastic material as the panels of the chamber shell 26. The vertical plenum wall 48 is mounted to facilitate removal and cleaning. The vertical plenum wall 48 would preferably be comprised of acrylic plastic and have thickness between $\frac{3}{8}$-$\frac{5}{8}$". The vertical plenum wall 48 may be held in place by vertical support member 56 adhered to the side panels of the chamber shell.

FIG. 4 demonstrates the apparatus of this invention is adapted to provide a highly effective means for maintaining equalized and constant flow of air about all plants in the growth chamber 44. This is accomplished by the closed loop recirculating system, which constrains the return air flow to passage through the air return plenum duct 50 which connects as part of the cycle with the inlet of the air conditioning system for recirculation. The air passage is then through a plurality of flow control means, which means comprises the flooring having perforations or slots which are configured so that there will be air passing to all plants regardless of where placed in the chamber, and to ensure there is uniformity of air flow over all plants irrespective of location in the growth chamber. A circulating fan 65 within the air conditioning chamber ensures that uniform air flow rate is provided to the growing environment. The flow rate has been determined to preferably be about 0.4 meters/sec, upward through the growth chamber floor but could vary from about 0.2 meters/sec to about 0.5 meters/sec and still accomplish the purpose of the invention.

The air conditioning system is preferably individual chiller coils, for multiple chamber applications, linked to a central chiller system and reservoir. This would be a freon based chiller utilizing a percentage glycol solution. Individual freon coils with individual direct expansion refrigeration systems can also be employed, but are less stable and less efficient. The temp. RH & CO2 controls are mounted remotely from the air conditioning equipment, preferably in a console inside a support structure or; failing that, in a separate waterproof housing, which is indicated by a separate remote box or housing 66 having secure construction and low profile to prevent shadowing.

Humidity control is required for maintaining the dew point of the air in the chamber below the temperature of the chamber walls. The purpose of this is to prevent water condensation on the chamber walls and potential reflecting light out of the growth chamber 44.

Performance specifications for environmental controls would be based on intended temperature control within the chamber between 10 and 45 degrees Centigrade with ±0.5 degrees Centigrade temporal variation. Generally, for most climates, lower ambient temperatures will be experienced in winter and higher temperatures in summer. Therefore, the cooling system may have capacity to maintain a maximum temperature gradient between the inside and outside of the chamber of preferably about 30 degrees Centigrade, but could vary by ±10 degrees Centigrade, and to remove solar heat. The heating system may be adapted to maintain a temperature of 30 degrees Centigrade plus or minus an acceptable range dependent on the particular item being grown, above ambient without solar heating. When in use, some screening may be employed in conjunction with the day-lit chamber with the day-lit chamber to the height of the top of the plant crop. This would simulate the presence of other plants surrounding the plants in the chamber.

The chamber shell 26 and growth chamber 44 are designed for use with a microprocessor/controller 68 in FIG. 5 for temperature and relative humidity control. This microprocessor can also be used in conjunction with the growth chamber for individual carbon dioxide control and monitoring. As depicted in FIG.5, and as an example of a suitable control, there is a two line by forty character alphanumeric liquid crystal display 70, twenty key membrane keypad. The C3 microprocessor fully supports serial communications for point to point and network applications. Networking allows up to 250 C3 controllers to be controlled by an external computer or from any of the individual controllers. This microprocessor is adapted for temperature control range between −50 degrees Centigrade and 99 degrees Centigrade with 0.05 degrees resolution. Relative humidity range between 12% and 92% with 0.05% resolution. Display values are to 0.1 degree in temperature and 1% humidity. Of course, other suitable micros or commercially available controllers could be utilized.

In use, the day-lit chambers are ordinarily surrounded with screens which intercept about 60 per cent the solar radiation to the height of top of the crop. These are intended to simulate the presence of other plants surrounding the plants in the chamber, but they also have the effect of reducing solar heating load.

While in accordance with the patent statutes, the best mode and preferred embodiment of the invention have been described, it is to be understood that the invention is not limited thereto, but rather is to be measured by the scope and spirit of the appended claims.

What is claimed is:

1. A stand-alone growth cabinet for outdoor use in conducting plant experiments, comprising:
   a frameless upright container comprised of transparent interconnected panels forming a day-lit chamber shell, said chamber shell comprising a pair of side panels, a back panel, a front panel, a roof, and an integral floor panel;
   wherein said interconnected panels are chemically bonded along their periphery to provide a substantially air-tight and frameless chamber shell, adapted to maximize entry of daylight into said growth cabinet;
   a horizontal surface within said chamber shell forming a horizontal plant supporting floor, said horizontal floor having perforations or slots there through on its entire surface;
   a transport vertical surface within said chamber shell rising from said horizontal floor to define an air return plenum adjacent the back panel of said chamber shell, said transparent vertical surface adapted to direct air from said perforated or slotted horizontal floor over the top of said vertical surface and down said air return plenum, said vertical surface and horizontal floor together defining a growth chamber with the chamber shell, said growth chamber being adjacent to the front panel of the chamber shell;
   said transparent panels and said transparent vertical surface being formed of the same plastic material;
   a base having sufficient height to insulate said growth chamber from ground temperature and defeating wind loads;
   means for opening and sealingly closing said growth chamber, said means comprising a door at the front of said chamber shell;
   means for equalized distribution of air forced into said growth chamber associated with said chamber shell; and,
   means for control of temperature and humidity, and optionally for monitoring and controlling of carbon dioxide within said growth chamber associated with said chamber shell.

2. The growth cabinet of claim 1, wherein said means for equalized distribution of air comprises a closed loop recirculating system ducting air rising vertically through the horizontal plant supporting floor which connects as part of a cycle with an inlet of an air conditioning system for recirculation.

3. The growth cabinet of claim 1, wherein said roof is sloped.

4. The growth cabinet of claim 1 wherein said door is transparent and is rotatably coupled to an adjacent side or roof panel, and wherein said means for opening and sealingly closing said growth chamber further comprises transparent structural sway bracing for reinforcing said door and defining a front opening, and gasket material located around the door opening so that the door may be sealingly closed.

5. The growth cabinet of claim 1 wherein said cabinet shell is supported on said base and is above said base and wherein said base is secured to a foundation pad.

6. The growth cabinet of claim 1 wherein said front, side and back panels extend from said base to said roof and are made of a single plastic material over their entire extent.

7. The growth cabinet of claim 1 wherein said horizontal floor is supported by free-standing horizontal supports which are not adhered to the side panels.

8. The growth cabinet of claim 1, wherein said transparent interconnected panels have a plurality of horizontal support members bonded on the inside surfaces of said panels.

9. The growth cabinet of claim 8, wherein said opposing side panels have a plurality of vertical support members bonded on their inside surfaces.

10. The growth cabinet of claim 9, wherein said horizontal floor is upheld within said chamber shell by said horizontal support members.

11. The growth cabinet of claim 10, wherein the perforated or slotted horizontal floor is expanded metal.

12. The growth cabinet of claim 11, wherein said metal is an expanded steel having ¼" diameter hole pattern on 1" centers.

13. The growth cabinet of claim 1, wherein said vertical surface defining said air return plenum is a plenum wall which is shorter than the height of the growth chamber for air transfer from the growth chamber to said plenum air return.

14. The growth cabinet of claim 1, wherein the means for control of temperature, humidity, and optionally for monitoring and controlling of carbon dioxide within said growth chamber comprises a microprocessor/controller adapted for temperature control range between −50 degrees Centigrade and 99 degrees Centigrade with 0.05 degrees resolution, relative humidity range between 12% and 92% with 0.05 resolution, and display values 0.1 degrees in temperature and 1% humidity.

* * * * *